United States Patent [19]

Smith

[11] Patent Number: 5,140,867
[45] Date of Patent: Aug. 25, 1992

[54] VIBRATION SUPPRESSOR FOR HANDLEBARS

[76] Inventor: Robert T. Smith, 2289 B. Sun Glory La., San Jose, Calif. 95124

[21] Appl. No.: 729,708

[22] Filed: Jul. 15, 1991

[51] Int. Cl.⁵ ............................................. B62K 21/14
[52] U.S. Cl. ................................................. 74/551.2
[58] Field of Search ............... 74/488, 489, 551.2, 74/557.1, 543

[56] References Cited

U.S. PATENT DOCUMENTS

| | | | |
|---|---|---|---|
| 725,691 | 4/1903 | Fletcher | 74/551.2 |
| 864,056 | 8/1907 | Altenburger | 74/551.2 |
| 1,262,787 | 4/1918 | Harley | 74/551.2 |
| 1,568,911 | 1/1926 | O'Brien | 74/551.2 |
| 2,041,704 | 5/1936 | Gordon et al. | 74/551.2 |
| 2,111,028 | 3/1938 | Miller | 74/551.2 |
| 4,420,989 | 12/1983 | Finkle | 74/551.2 |
| 4,939,950 | 7/1990 | Girvin | 74/551.2 |

*Primary Examiner*—Dirk Wright
*Attorney, Agent, or Firm*—A. C. Smith

[57] ABSTRACT

An attachment for a handlebar includes a pair of relatively movable elements that are constrained against movement in a substantially vertical plane by resilient elements that generate opposing centering forces in response to relative movement of the pair of elements. The resilient force may be manually adjusted by altering the configuration of the mounting conditions of the resilient elements. Safety limiters are provided to inhibit excessive movements of the pair of relatively movable elements.

20 Claims, 5 Drawing Sheets

VIBRATION SUPPRESSOR FOR HANDLEBARS

FIELD OF THE INVENTION

This invention relates to vibration suppressors and more particularly to an integral structure for attachment, for example, to the handlebar of a wheeled vehicle to reduce the shock and vibration transmitted to the operator of the vehicle via the handgrips.

BACKGROUND OF THE INVENTION

The current uptrend in the popularity of bicycling as an active sport is enhanced in part by several significant improvements and design innovations that have dramatically altered the characteristics of bicycles. Specifically, multi-speed shifting mechanisms, lightweight frames, and improved front-wheel fork designs have given rise to a category of bicycles that are particularly suited for off-road, or so-called 'mountain biking'. These bicycles have emerged as lightweight, wide-tired machines that are rugged enough to withstand the abuses of bumpy and dusty terrain. One difficulty encountered by operators of these 'mountain bikes' is the shock and vibration that is distributed from the riding surface, through the frame, to the operator. Although some of the shock and vibration may be absorbed by the operator by relying upon a combination of knee-action stance on the pedals, and angular positions of the arms relative to the handgrips, some mechanical schemes have emerged for suppressing the shock and vibration that is imparted to the operator by relying upon articulated frame sections that spring-mount or oil-damp one or both of the front and back wheels. Other mechanical schemes for suppressing the shock and vibration imparted to the operator of such a vehicle include articulated handlebars or stems (or 'goosenecks') that suppress the vibration imparted at least to the arms, wrists and hands of the operator. Devices of these types are disclosed in the literature (See, for example, U.S. Pat. No. 4,420,989 and U.S. Pat. No. 4,939,950). One difficulty encountered with devices of these types is the additional weight and bulkiness of numerous components required to provide substantial excursions in the movement of the handgrips relative to the rest of the frame. And, such excessive movement of the handgrips may be undesirable while the operator shifts body position and arm angle relative to the handgrips to maintain stability and control over the bicycle, for example, during downhill maneuvering on irregular terrain. In addition, devices of the type which operate to damp vibrations at the stem reduce the ability of the operator to cross cancel some of the shock and vibration attributable to the terrain by moving hands and arms independently of one another in a manner that dissipates the shock and vibration through the operator's arms and torso.

SUMMARY OF THE INVENTION

In accordance with the present invention, a lightweight shock and vibration suppressor is incorporated into an assembly that is attached to the handlebars of a vehicle such as a bicycle near the handgrips to reduce the amount of shock and vibration that can be imparted from the frame of the bicycle to the hands, wrists and arms of the operator. Small excursions of movement of the handgrips relative to the handlebars are resiliently restrained along one axis of movement to facilitate ease of control over the bicycle while suppressing the amount of shock and vibration that is transferred to the operator through the handgrips. The resilient forces may be readily adjusted to adapt the assembly to the operator's preferences for any particular terrain encountered.

DESCRIPTION OF THE PREFERRED EMBODIMENT

Figure 1:
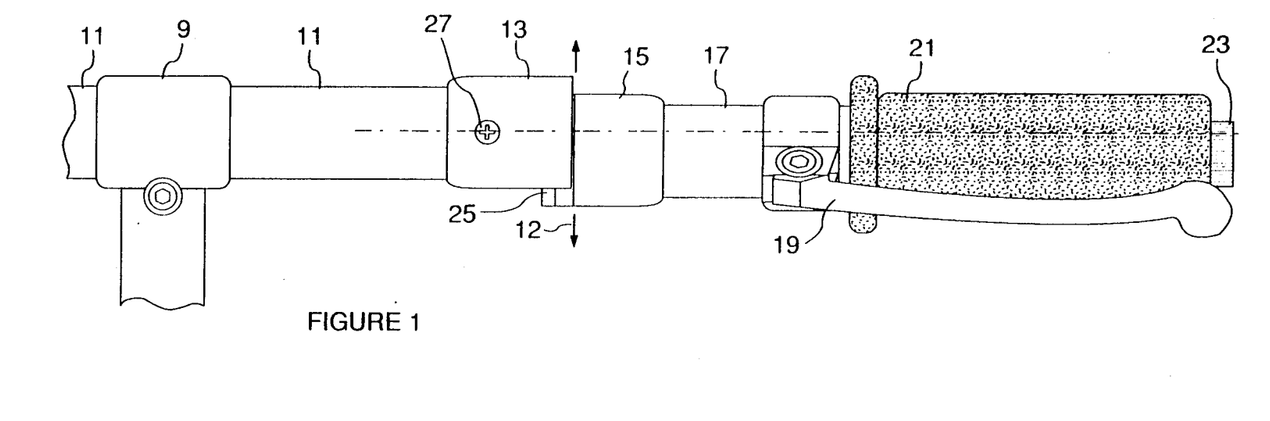
FIG. 1 is a partial front view of a handlebar apparatus according to the present invention.

Referring now to FIG. 1, there is shown a partial front view of a handlebar structure supported by a conventional stem or 'gooseneck' component 9. This stem component 9 attaches in conventional manner to the fork (not shown) and front steerable wheel of a vehicle such as a bicycle. The stem 9 supports a handlebar 11 that protrudes to the left and right sides for attachment of handgrips to the ends thereof. In accordance with one embodiment of the present invention, a shock and vibration suppressor is mounted on the handlebar 11 between the stem and handgrips on each side of the stem. Specifically, an articulated body includes a mounting element 13 and a movable element 15 that are channeled together to exhibit relative movement along only one axis 12. This axis 12 may be oriented substantially normal to the longitudinal axis of the handlebar 11 and substantially normal to the direction of travel of the vehicle. The two elements 13, 15 are channeled together for relative sliding motion therebetween using an oversquare mortise and tenon shaped channel, or an overlapping tongue and mating groove assembly as illustrated in the sectional top view of FIG. 2, or the like. The movable element 15 is attached to an extension 17 of the handlebar 11 to support thereon a gear-shifting mechanism (not shown), or a hand lever 19, for example for use as a hand-actuated brake, and a conventional handgrip 21 of suitable shape and composition to facilitate a comfortable handhold by the operator. An adjustment knob 23, described in detail later herein, extends beyond the end of the handgrip 21 to facilitate manual adjustment of the resiliency with which the relative movement of the elements 13,15 is opposed, as later described herein. Of course, an assembly of the type illustrated and described with reference to FIG. 1 is mounted on opposite sides of the stem 9 near each end of the handlebar 11, and the axis 12 may be rotated as desired about the longitudinal axis of the handlebar 11 to be substantially aligned with the operator's arms in riding position.

Figure 2:
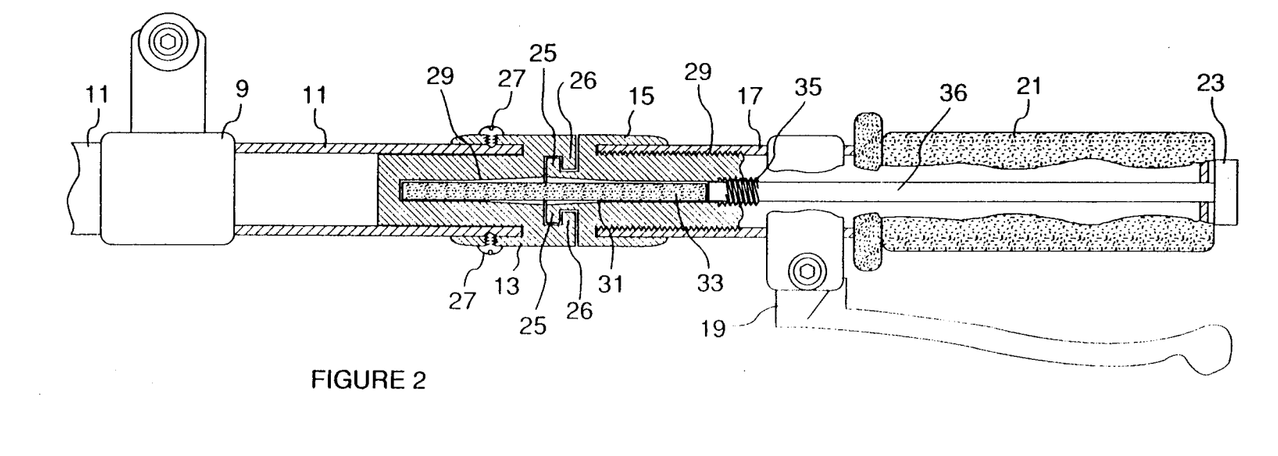
FIG. 2 is a partial sectional top view of the apparatus illustrated in FIG. 1.

Referring now to FIG. 2, there is shown a partial top sectional view of the embodiment of the invention illustrated in FIG. 1. The channelled mounting together of the mounting element 13 and the movable element 15 is illustrated as including an overlapping tongue 25 and a mating underlapping groove 26 that are adapted to constrain the relative motion of one element with respect to the other element only to sliding movement along the axis 12 (oriented normal to the page in FIG. 2). Of course, other structures may be used that constrain the relative movement of one element relative to the other element only along an axis that is oriented normal to the elongated axis of the handlebar. The mounting element 13 may be attached to the handlebar 11 by mating threads or by setscrews, as shown, and the movable element 15 may be attached to the extension 17 of the handlebar by setscrews or by mating threads 29, as shown. Of course, other suitable means of attachment such as welding, jam-fit, riveting, adhesive bonding, and the like may also be used to provide articulated sections of handlebar near the ends thereof.

In accordance with the illustrated embodiment of the present invention, each of the relatively slidable elements 13, 15 includes a substantially axial bore 29, 31 therein that traverses the sliding channel formed by the tongue 25 and the groove 26. A resilient element 33 is disposed within the bore 29, 31 to traverse the sliding channel and provide resilient opposing or centering force to the relatively slidable elements 13, 15 as they slide relatively along the channel and effectively impose shearing or deforming force on the resilient element 33. The bore 29, 31 may be slightly tapered or fluted near the sliding channel 25, 26 to accommodate the forces applied thereto without shearing or parting the resilient element 33, and to facilitate adjustment of the resilient centering force that must be overcome to move the elements 13, 15 from relatively centered position along the sliding channel 25, 26. Specifically, slightly fluting or tapering the bore 29, 31 near the sliding channel enables the resilient element 33 to flex and bend within the bore 29, 31 upon initial relative sliding movement of the elements 13, 15, and then undergo shearing force laterally applied thereto upon additional relative sliding movement of the elements 13, 15, thereby to provide substantially non-linearly increasing resilient centering or opposing force as a function of relative movement of the elements 13, 15 in either direction along the sliding axis 12. Thus, a greater degree of fluting of the bore 29, 31 near the sliding channel produces lesser resilient centering force in response to increased relative movement of the elements 13, 15. Of course, the fluting or tapering of the cross section of the bore may only be provided at the upper and lower portions of the bore in the direction of application of shearing forces thereto as the elements undergo relative sliding movement. Alternatively, the resilient element 33 may be axially compressed to deform and fill the bore 29, 31, including the fluted portions thereof near the sliding channel in order to effectively increase the resilient centering or opposing force produced by the resilient element 33 in response to the relative movement of the elements 13, 15. When thus axially compressed and deformed within the bore 29, 31, the resilient element 33 permits less initial flexure within the fluted region of the bore and also presents a larger cross-sectional area of resilient material oriented across the sliding channel to oppose the shearing force applied thereto during relative movement of the elements 13, 15. The resilient element 33 may include such elastomeric materials as silicone or neoprene or polyurethane rubber with a selected density to provide the resilient forces against the relative movement of the elements 13, 15, as previously described herein.

To facilitate convenient adjustability of the resilient centering force according to the present invention, the bore 29 within the mounting element 13 is 'blind', or butt-ended to receive the resilient element 33 within the bore only to a limited depth. The end of the bore 31 that is remote from the sliding channel 25, 26 includes threaded piston 35 coupled via rod 36 to the adjustment knob 23 for rotating the piston 3 into the bore 31, thereby to compress the resilient element 33 within the remaining length of the bore 29, 31 across the sliding channel 25, 26. As the piston 35 is rotated deeper into the bore 31, the resilient element 33 is distorted into the fluted region of the bore to increase the opposing or centering force provided thereby in the manner as previously described. Other manual adjustment schemes may be used to compress the resilient element including mounting of the handgrips in conventional manner for rotation relative to the extension 17 in order to screw in and axially compress the resilient element 33. Thus, manual adjustment of the amount of resiliency associated with relative movement of the elements 13, 15 may be conveniently provided by rotating the adjustment knob 23 (or other suitable manual adjustment element).

Figure 3:
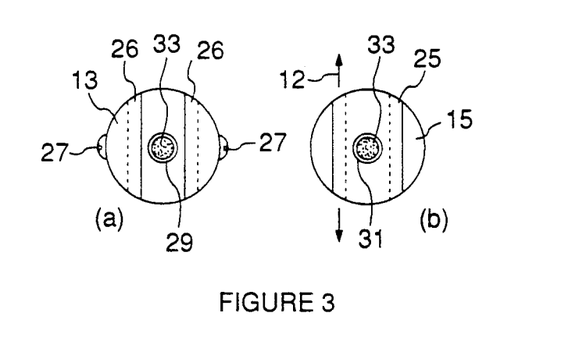
FIG. 3(a) is an end view of the element that is attached to the handlebar.
FIG. 3(b) is an end view of the element that forms the handgrip assembly of the handlebar.

Referring now to FIGS. 3(a) and 3(b), there are shown end views of the elements 13 and 15, respectively, illustrating the overlapping and interlocking tongue 25 and groove 26 that form the sliding channel for constraining the relative movement of the two elements 13, 15 substantially only along the axis 12. The resilient element 33 is disposed within the bore 29, 31 to occupy substantially less than the entire cross section of the bore, at least in the fluted regions thereof, in order to allow initial flexure and to allow distortion thereof into the fluted regions thereof to increase the resilient force produced thereby in the manner previously described herein.

Figure 4:
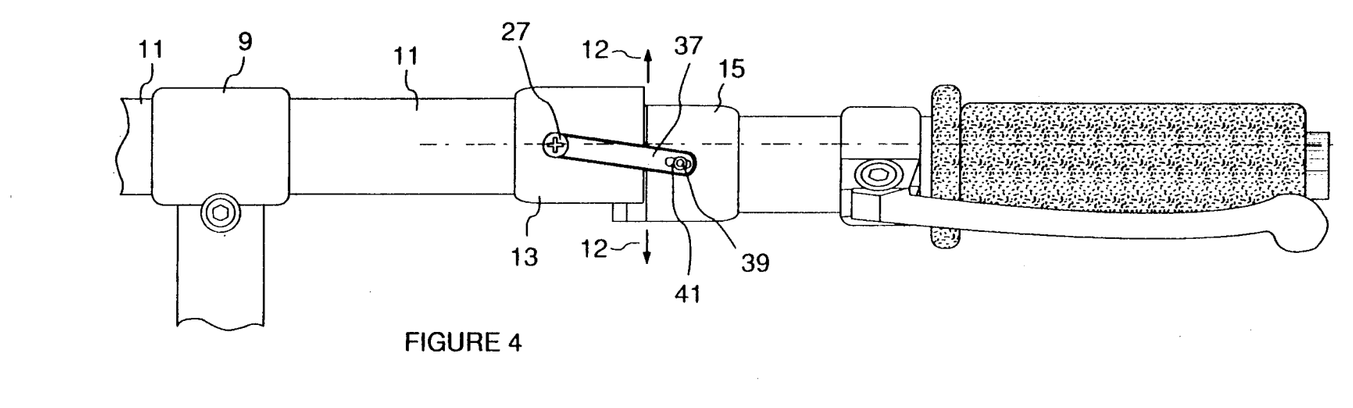
FIG. 4 is a front view of the apparatus illustrated in FIG. 1 including a safety limiter to inhibit excessive relative slide movement.
Figure 5:
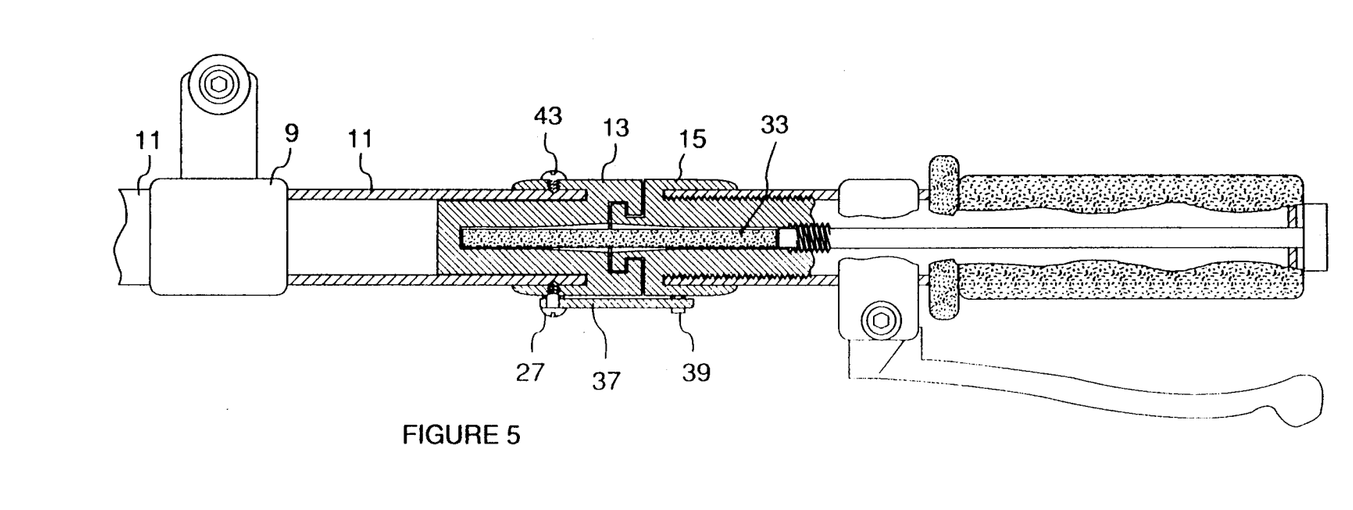
FIG. 5 is a partial top sectional view of the apparatus illustrated in FIG. 4.

Referring now to FIGS. 4 and 5, there are shown, respectively, a front view and a top sectional view of the embodiment of the invention illustrated in FIG. 1 including a safety link 37 disposed between the relatively slidable elements 13, 15 to inhibit relative motion thereof beyond a selected limit. At least one link 37 may be rotatably attached to the element 13 via one of the mounting screws 27, and may be slidably attached to the other element 15 via rivet or pin 39. The link includes a slot 41 in which the pin 39 may slide in order to compensate for a limited extent of elongation to the extreme end of the slot 41 as the elements 13, 15 relatively slide along the axis 12. Of course, more than one link 39 may be used, for example as mounted in similar manner between another mounting screw 43 on element 13 and another pin (not shown) in element 15. One or more links 37 thus mounted between the elements 13, 15 thus assure that the handgrip ends of the handlebar 11 may not exceed the allowable limited amount of relatively sliding movement, for example, on particularly bumpy terrain or resulting from complete shearing failure of the resilient element 33. Also, one or more links 37 may provide a lever arm by which resilient centering force is established between the elements 13, 15. For example, the link 37 may be coupled to a torsional spring laterally disposed within the element 13 in place of the mounting screw 27 to undergo torsional stress in response to relative sliding movement of the elements 13, 15. In this way, resilient centering force may also be generated to oppose the relative movement of the elements 13, 15.

Figure 6:
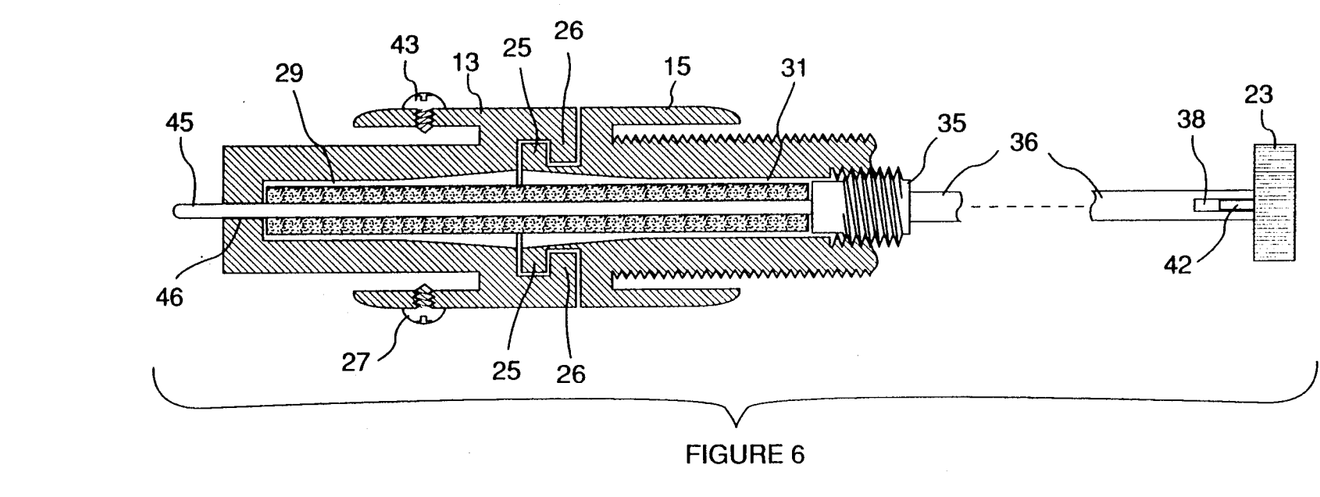
FIG. 6 is an exploded partial top sectional view of another embodiment of the present invention including a resilient rod for generating resilient centering force in response to relative sliding movement and for providing safety limitation to the extent of such sliding movement.

With reference now to FIG. 6, there is shown a top sectional exploded view of the relatively slidable elements 13, 15 including the interlocking channel 25, 26 and the resilient element 33 disposed within the internal bore 29, 31 in the elements 13, 15. In addition, the resilient element 33 is illustrated as including a resilient rod 45 disposed axially within the resilient element 33 substantially from end to end thereof to provide initial resilient centering force to the relatively slidable elements 13, 15 as well as a safety limiter to inhibit excessive sliding movement thereof. Specifically, the rod 45 may be formed, for example, of spring steel and is positioned substantially coaxially within the resilient element 33. The rod 45 is mounted in slidable engagement at one end thereof in the rotatable piston 35, with the other end of the rod 45 fixedly mounted in the borehole 46 in element 13. In this manner, the ends of the resilient rod 45 are maintained substantially parallel as the rod undergoes shear or flexing force in response to relative sliding motion of the elements 13, 15 to produce initial opposing or restoring centering force, perhaps prior to the resilient element 33 undergoing compressional force near the sliding channel 25, 26. Of course, if the resilient element 33 is sufficiently compressed within the bore 29, 31 to undergo shear compression upon initial sliding movement along the channel 25, 26, then both the resilient rod 45 and the resilient element 33 provide the opposing resilient centering force to retain the elements 13, 15 substantially centered within the length of travel along the channel 25, 26. Alternatively, by adjusting the relative spacing between the mountings of the ends of the rod 45, for example by the adjustment of the position of the piston 35 within the bore 31, the rod 45 is disposed to generate higher centering force per unit of relative sliding movement of the first and second elements with the mountings closer together, independent of whether an elastomeric element 33 is also disposed within the bore 29, 31. In addition, the resilient rod 45 provides a substantial safety limitation in the relative movement of the elements 13, 15 in the event of complete shearing failure of the resilient element 33 since the rod 45 (formed, for example, of spring steel) is incapable of being sheared at the channel 25, 26 by the manual forces that are likely to be exerted on the handgrip 21 relative to the handlebar 11. In FIG. 6, the adjustment knob 23 is shown coupled to the rotatable piston 35 via rod 36 that includes a slot 38 for engaging an associated tab 42 attached to the knob 23 to facilitate convenient rotation of the piston 35 and rod 36 while also accommodating the resultant axial variation in length as the piston 35 screws in and out of the element 15. Of course, other spline-type techniques may also be used in connection with an adjustment knob to manually adjust the resilient centering force provided by the resilient element 33 or by the rod 45 either alone or in combination, as previously described herein.

Figure 7:
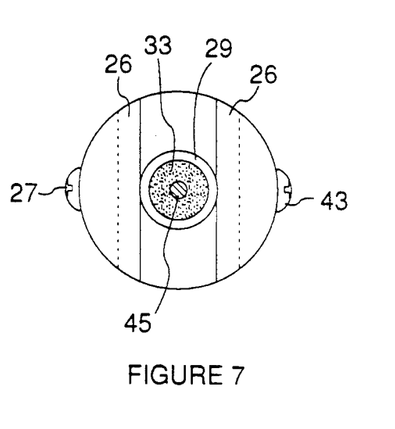
FIG. 7 is an end view of the element of FIG. 6 that is shown attached to the handlebar.

Referring now to FIG. 7, there is shown a sectional view of the element 13 near the interlocking sliding channel which illustrates the coaxial orientation of the rod 45 within the resilient element 33. By retaining the ends of the rod 45 in substantial parallel alignment within the bore 46 and piston 35, the rod 45 thus undergoes flexure to create a resilient centering opposing force in response to relative movement of the elements 13, 15, and also provides safety limitation against excessive sliding movement by opposing shearing force applied thereto.

Figure 8:
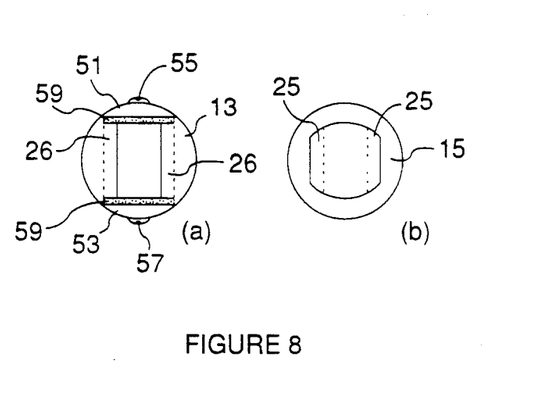
FIG. 8(a) is an end view of the element that is attached to the handlebar in the embodiment illustrated in FIG. 9.
FIG. 8(b) is an end view of the element that forms the handgrip assembly in the embodiment illustrated in FIG. 9.

Referring now to FIG. 8(a), there is shown an end view of the element 13 including an interlocking channel 26 disposed to retain an interlocking element 25, as illustrated in the end view of FIG. 8(b), and including upper and lower segments 51, 53 that are secured to the respective elements 13, 15 by one or more bolts 55, 57. Each of the segments 51, 53 retains an elastomeric pad 59 in place at the respective upper and lower ends of the interlocking channel 25 26 in close proximity to the respective upper and lower ends of the element 15. Thus, the elements 13, 15 are arranged to slide along the axis of the interlocking channel against the restoring or centering forces of the upper and lower elastomeric pads 59. The sliding element 15 may be shaped at the upper and lower ends thereof in a curved manner, for example as shown in FIG. 8(b), that increases the contact surface against the elastomeric pad 59 as the pad deforms under the force exerted thereon by the relative movement of the elements 13, 15, thereby to provide non-linear restoring or centering force as a function of relative displacement of the two elements 13, 15. In addition, the segments 51, 53 provide safety constraint against excessive relative movement of the elements 13, 15 and also facilitate assembly of the interlocking channel 25, 26.

Figure 9:
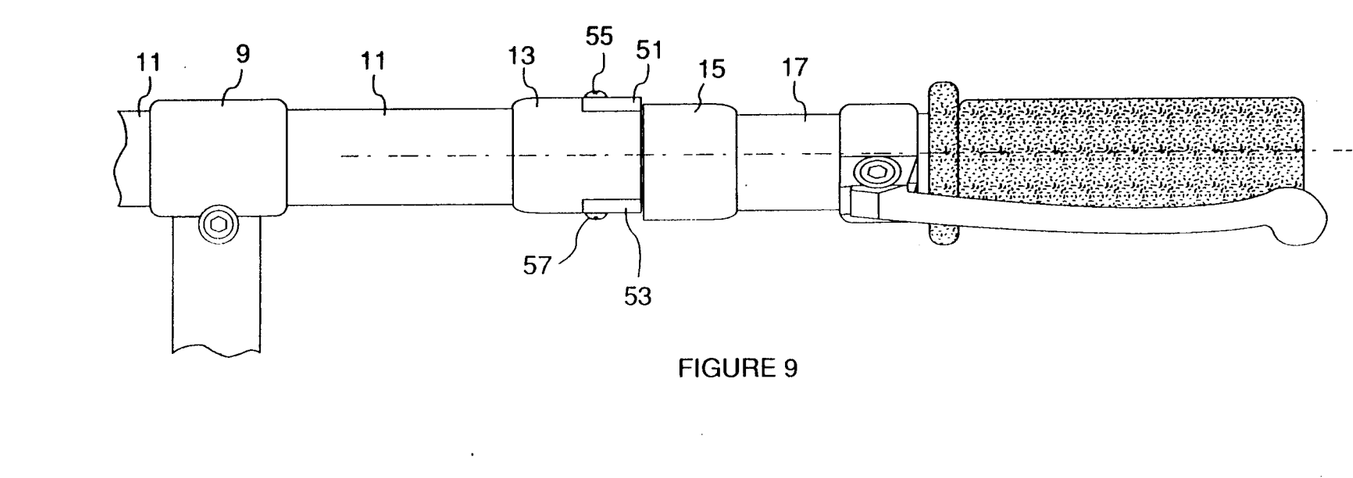
FIG. 9 is a partial front view of handlebar apparatus according to another embodiment of the present invention.

Referring now to FIG. 9, there is shown a partial front view of the handlebar apparatus including the constraining segments 51, 53 of the embodiment illustrated in FIGS. 8(a) and 8(b). In this embodiment of the present invention, the elements 13, 15 are arranged to undergo relative movement along the interlocking channel formed thereon and against the elastomeric pads that are retained at the upper and lower ends of the channel by the segments 51, 53 that also provide safety restraints against excessive relative movement of the elements 13, 15 along the slide axis of the interlocking channel.

Figure 10:
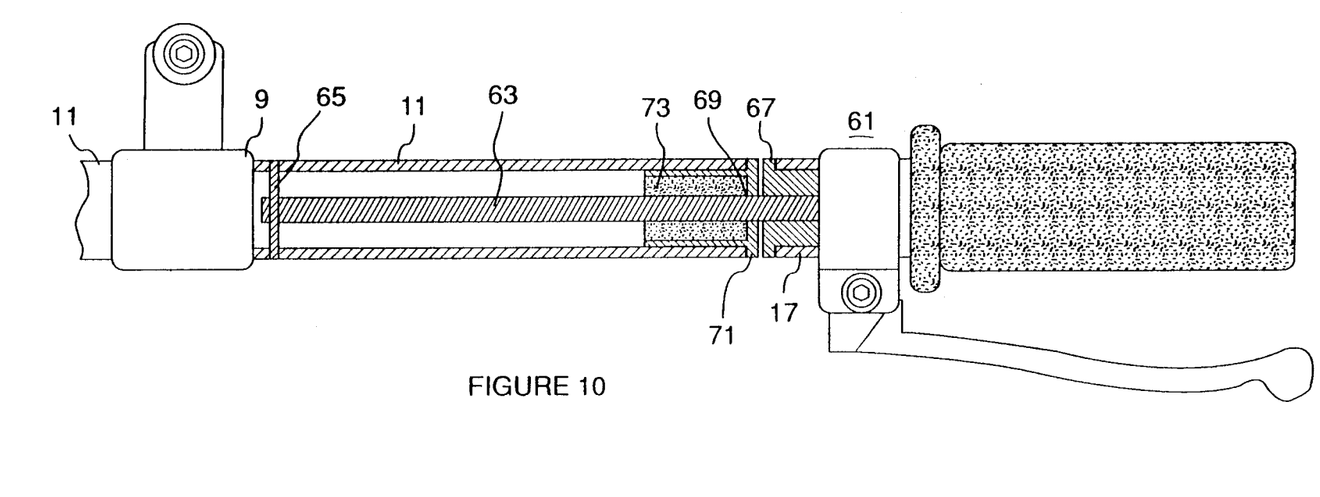
FIG. 10 is a partial top sectional view of another embodiment of the present invention.
Figure 11:
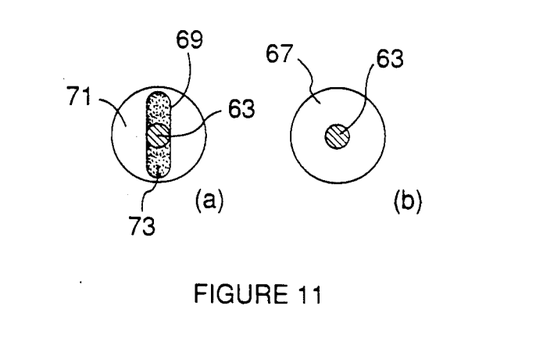
FIG. 11(a) is an end view of the handlebar in the embodiment illustrated in FIG. 10.
FIG. 11(b) is an end view of the handgrip assembly in the embodiment illustrated in FIG. 10.
Figure 12:
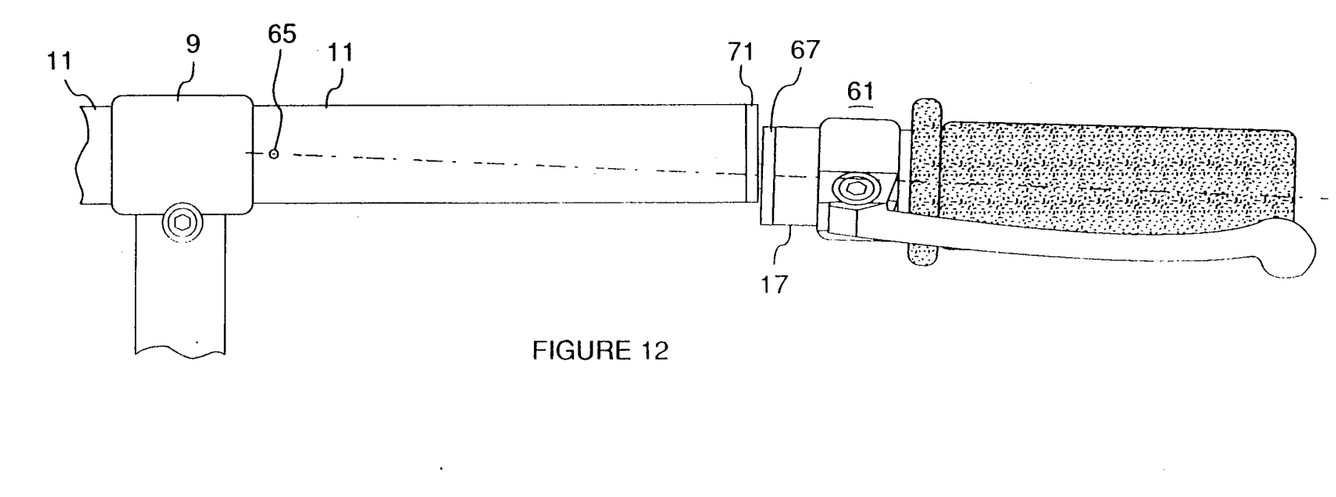
FIG. 12 is a partial front view of the handlebar apparatus in the embodiment illustrated in FIG. 10.

Referring now to FIG. 10, there is shown a partial sectional top view of another embodiment of the present invention in which each handgrip assembly 61 is mounted on opposite sides of the stem 9 near the ends of the handlebar via an internal rod 63 that is rigidly attached to the handgrip assembly 61 and that is also pivotally attached 65 to the handlebar 11 near the stem 9. In this embodiment, the rod 63 is rigidly attached to a plug 67 that is firmly attached to the extension 17, and is attached to the handlebar 11 via pivot pin 65. Of course, the rod 63 may also be rigidly mounted in a plug that is firmly attached inside the handlebar near the stem 9 to facilitate flexural movement of the remote end of the rod 63 (attached to assembly 61) relative to the proximate end thereof near the stem 9. In either case, the rod 63 is constrained to slide within a substantially vertically-aligned slot 69 within the end cap 71, as indicated in the sectional end view of FIG. 11(a). The end cap 71 is secured to the remote end of the handlebar 11 and includes the slot 69 is adapted to receive the sides of the rod 63 in sliding engagement. The sides of the rod 63 may therefore by flattened to inhibit twist of the rod 63 and handgrip attached thereto. The end cap 71 retains therein an elastomeric member 73 that surrounds the rod 63 to be deformed thereby as the rod slides substantially up and down within the slot 69. Thus, the handgrip assembly 61 is constrained to move only in a vertical plane within the slot 69 against the restoring or centering force imparted by the elastomeric member 73. The rod 63 preferably has significant length between mounting locations 65, 67, as illustrated in the partial front view of FIG. 12, to provide negligible arcuate movement of the handgrip assembly 61 in the vertical plane relative to the handlebar 11.

Therefore, the apparatus for handlebars constructed according to the present invention suppresses shock and vibration that would otherwise be transmitted to the hands, wrists and arms of a user by providing limited resilient movement of the handgrips relative to the handlebar within a vertical plane, and by providing safety constraints against excessive amounts of such sliding movement.

What is claimed is:

1. Apparatus for a handlebar comprising:
   a first element disposed on a handlebar;
   a second element coupled to the first element for restraining the first and second elements to relative movement therebetween substantially only along an axis that is selectively oriented substantially normal to the handlebar; and
   resilient means disposed to provide opposing resilient force against relative movement of the first and second elements.

2. Apparatus according to claim 1 wherein the coupling between the first and second elements includes at least one interlocking channel.

3. Apparatus according to claim 1 wherein said resilient means includes an elastomeric element disposed to be deformed in response to relative slidable movement of the first and second elements about a substantially central position.

4. Apparatus according to claim 1 wherein each of said first and second elements includes a bore therein that aligns at a substantially central position of the relative slidable movement thereof; and
   said resilient means is disposed in said bore within each of the first and second elements for subjection to deforming force thereon in response to relative slidable movement of the first and second elements.

5. Apparatus according to claim 4 wherein said resilient means includes an elastomeric element in the bore, and the bore in at least one of the first and second elements includes in a region thereof near the coupling together of the first and second elements a section of increased cross sectional area not occupied by the elastomeric element in an undeformed configuration.

6. Apparatus according to claim 5 comprising: adjustment means disposed to deform the elastomeric element into said section of increased cross sectional area to increase the cross sectional area of the elastomeric element that is subjected to deforming force in response to relative slidable movement of the first and second elements.

7. Apparatus according to claim 1 comprising:
   securing means for rigidly attaching the first element to the handlebar; and
   means providing a handgrip disposed on the second element.

8. Apparatus according to claim 1 comprising:
   link means disposed between the first and second elements for limiting the extent of relative slidable movement therebetween.

9. Apparatus according to claim 8 wherein said link means includes at least one link pivotally mounted near one end thereof to one of said first and second elements and including an aperture near the other end thereof; and
   pin means disposed on the other of the first and second elements to slidably engage the link within the aperture therein for limiting the extent of relative slidable movement of the first and second elements.

10. Apparatus according to claim 4 wherein said resilient rod means includes a flexible rod disposed within the bore in each of the first and second elements, the flexible rod having ends mounted in each of the first and second elements for exerting flexing force on the flexible rod in response to relative slidable movement of the first and second elements.

11. Apparatus according to claim 10 wherein said flexible rod includes spring steel and is disposed within the resilient means to traverse the coupling between the first and second elements for generating centering opposing force in response to relative slidable movement of the first and second elements and for limiting the extent of said relative movement.

12. Apparatus according to claim 6 wherein said adjustment means compresses the elastomeric element into said bore for increasing the opposing centering force generated thereby in response to relative slidable movement of the first and second elements.

13. Apparatus according to claim 8 wherein said resilient means operates through said link means to exert resilient centering force on the first and second elements in response to relative slidable movement thereof.

14. Apparatus for a handlebar comprising:
    a first element attached to the handlebar and including a slide element oriented substantially normal to the handlebar;
    a second element including an engaging slide element for forming with the slide element of the first element a slide channel that restrains the first and second elements to relative sliding movement substantially only along an axis that is aligned substantially normal to the handlebar and with a vertical component of orientation of the axis; and
    resilient means carried by at least one of the first and second elements and operatively coupled to the other of the first and second elements to generate resilient centering force thereon in response to the relative movement thereof.

15. Apparatus according to claim 14 wherein
    said second element includes a handqrip attached thereto; and said axis is oriented skewed from vertical for substantial alignment with an arm of a user while grasping the handgrip.

16. Apparatus according to claim 14 wherein each of said first and second elements includes a substantially axial bore therein through the slide channel formed thereby; and said resilient means includes an elongated elastomeric element disposed in the bore traversing the slide channel to be resiliently deformed in response to the relative sliding movement of the first and second elements.

17. Apparatus according to claim 16 wherein the bore in at least one of the first and second elements tapers in cross sectional dimension inwardly from the slide channel from a cross sectional dimension larger than the cross sectional dimension of the elastomeric element at the slide channel.

18. Apparatus according to claim 17 comprising:

adjustment means carried by at least one of the first and second elements for urging the elastomeric element axially into the bore for deforming the elastomeric element to increase the cross sectional dimension thereof into the tapered bore at the slide channel.

19. Apparatus according to claim 14 wherein the resilient means includes a flexible rod having a mount at one end thereof in the first element and having a mount at another end thereof in the second element for traversing the slide channel to generate resilient centering force in response to relative sliding movement of the first and second elements, and to oppose shearing in the slide channel under forces applied thereto to inhibit such relative sliding movement in excess of a selected limit.

20. Apparatus according to claim 19 comprising:

adjustment means forming a mount for one of the ends of said flexible rod that is positionable at various distances relative to the mount for another of the ends of the rod to alter the centering force generated thereby in response to relative sliding movement of the first and second elements in relation to the distance between the mounts for the ends thereof.

* * * * *